(12) United States Patent
Wei et al.

(10) Patent No.: US 11,321,242 B2
(45) Date of Patent: May 3, 2022

(54) EARLY ACKNOWLEDGEMENT OF TRANSLATION LOOKASIDE BUFFER SHOOTDOWNS

(71) Applicant: VMware, Inc., Palo Alto, CA (US)

(72) Inventors: Michael Wei, Santa Clara, CA (US); Nadav Amit, Mountain View, CA (US); Amy Tai, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/021,834

(22) Filed: Sep. 15, 2020

(65) Prior Publication Data

US 2022/0083476 A1    Mar. 17, 2022

(51) Int. Cl.
| | | |
|---|---|---|
| *G06F 12/1027* | (2016.01) | |
| *G06F 12/0804* | (2016.01) | |
| *G06F 9/48* | (2006.01) | |
| *G06F 12/1009* | (2016.01) | |

(52) U.S. Cl.
CPC ........ *G06F 12/1027* (2013.01); *G06F 9/4812* (2013.01); *G06F 12/0804* (2013.01); *G06F 12/1009* (2013.01); *G06F 2212/1032* (2013.01); *G06F 2212/682* (2013.01)

(58) Field of Classification Search
CPC ............... G06F 12/1027; G06F 9/4812; G06F 12/1009; G06F 12/0804; G06F 2212/1032; G06F 2212/682
See application file for complete search history.

(56) References Cited

U.S. PATENT DOCUMENTS

| | | | |
|---|---|---|---|
| 6,631,452 B1 * | 10/2003 | Lin ...................... | G06F 9/30043 711/154 |
| 10,078,519 B2 | 9/2018 | Weissmann et al. | |
| 2005/0027914 A1 * | 2/2005 | Hammalund ......... | G06F 9/4812 710/260 |
| 2014/0181388 A1 * | 6/2014 | Mohandru .......... | G06F 12/0891 711/105 |
| 2017/0161209 A1 * | 6/2017 | Bussa ................. | G06F 12/1027 |
| 2017/0286300 A1 * | 10/2017 | Doshi ................. | G06F 12/1009 |
| 2017/0357595 A1 * | 12/2017 | Northup .............. | G06F 12/1027 |
| 2018/0322051 A1 * | 11/2018 | Heller ...................... | G06F 13/16 |
| 2019/0042671 A1 | 2/2019 | Caspi et al. | |
| 2019/0370049 A1 * | 12/2019 | Gopalan ............. | G06F 9/45558 |

OTHER PUBLICATIONS

CVE-2017-5754. Available from NVD, CVE-ID CVE-2017-5754, https://nvd.nist.gov/vuln/detail/CVE-2017-5754, Jan. 1, 2018. [Online; accessed May 21, 2019] (9 pages).

(Continued)

*Primary Examiner* — Sean D Rossiter

(57) ABSTRACT

Techniques for implementing early acknowledgement for translation lookaside buffer (TLB) shootdowns are provided. In one set of embodiments, a first (i.e., remote) processing core of a computer system can receive an inter-processor interrupt (IPI) from a second (i.e., initiator) processing core of the computer system for performing a TLB shootdown of the first processing core. Upon receiving the IPI, an interrupt handler of the first processing core can communicate an acknowledgement to the second processing core that the TLB of the first processing core has been flushed, prior to actually flushing the TLB.

19 Claims, 6 Drawing Sheets

(56) References Cited

OTHER PUBLICATIONS

Nadav Amit. "Optimizing the TLB shootdown algorithm with page access tracking". In USENIX Annual Technical Conference (ATC), pp. 27-39, 2017.
ARM Ltd. ARMv8—A Architecture Reference Manual, 2013 (1 page).
Amro Awad,et al. "Avoiding TLB Shootdowns through self-invalidating TLB entries". In 2017 26th International Conference on Parallel Architectures and Compilation Techniques (PACT), pp. 15. IEEE, 2017.
Manu Awasthi, et al., "Handling the Problems and Opportunities Posed by multiple on-chip memory controllers". In ACM/IEEE International Conference on Prallel Architecture & Compilation Techniques (PACT), pp. 319-330, 2010.
Andrew Baumann, Hardware is the new software. In Proceedings of the 16th Workshop on Hot Topics in Operating Systems, pp. 132-137. ACM, 2017.
Andrew Baumann, et al., "The Multikernel: a New OS Architecture for Scalable Multicore Systems". In ACM Symposium on Operating Systems Principles (SOSP), pp. 29-44, 2009.
David L. Black, et al., "Translation Lookaside Buffer Consistency: a Software Approach". In ACM Architectural Support for Programming Languages & Operating Systems (ASPLOS), pp. 113-122, 1989.
Alexandre Chartre. mm/x86: "Introduce Kernel Address Space Isolation". Linux Kernel Mailing List, https://lkml.org/lkml/2019/7/11/364, 4 pages, Jul. 11, 2019.
Austin T Clements, et al. "RadixVM: Scalable Address Spaces for Multithreaded Applications". In ACM SIGOPS European Conference on Computer Systems (EuroSys), pp. 211-224, 2013.
Jonathan Corbet. "Realtime and Interrupt Latency". LWN.net, https://lwn.net/Articles/139784/, 3 pages, 2005.
Jonathan Corbet. "Memory compaction", 2010 (2 pages).
Jonathan Corbet. "Memory Management Locking". LWN.net, https://lwn.net/Articles/591978/, 2014 (2 pages).
Russ Cox, M. Frans Kaashoek, and Robert Morris. "Xv6, a simple unix-like teaching operating system", 96 pages. 2011.
Mel Gorman. "TLB flush multiple pages per IPI v4". Linux Kernel Mailing List, https://lkml.org/lkml/2015/4/25/125, 2015 (2 pages).
Daniel Gruss, Moritz Lipp, Michael Schwarz, Richard Fellner, Clémen-tine Maurice, and Stefan Mangard. "KASLR is dead: long live KASLR". In International Symposium on Engineering Secure Software and Systems, 16 pages. Springer, 2017.
Dave Hansen. "X86 TLB Flushing: Invpcid vs. Deferred cr3 write". Linux Kernel Mailing List, https://lkml.org/lkml/2017/12/5/1082, 2 pages, 2017.
Intel Corporation. Intel 64 Architecture x2APIC Specification, 49 pages, 2008.
Intel Corporation. Intel 64 and IA-32 Architectures Software Developer's Manual. Reference No. 325462-057US, 2015. https://software.intel.com/en-us/articles/intel-sdm, (504 pages).
Alexey Kopytov. SysBench: A System Performance Benchmark. sysbench.sourceforge.net. (10 pages), Sep. 21, 2020.
Mohan Kumar, et al. "LATR: Lazy translation coherence". In ACM Architectural Support for Programming Languages & Operating Systems (ASPLOS), 2018 (14 pages).
Moritz Lipp, et al. "Meltdown: Reading Kernel Memory from user Space". In USENIX Security Symposium, 2018 (19 pages).
Andy Lutomirski. "x86/mm: PCID and INVPCID". https://lwn.net/Articles/671299/, 2016 (2 pages).
MITRE. CVE-2017-5715: branch target injection, spectre-v2. https://cve.mitre.org/cgi-bin/cvename.cgi?name=CVE-2017-5715, 2018. [On-line; accessed May 21, 2019] (5 pages).
Mark Oskin, et al., "A Software-Managed Approach to Die-Stacked Dram". In 2015 International Conference on Parallel Architecture and Compilation (PACT), pp. 188-200. IEEE, 2015.
Binh Pham, et al., "TLB shootdown Mitigation for Low-power many-core servers with 11 Virtual Caches". IEEE Computer Architecture Letters, 17(1):17-20, 2017.
Rick van Riel. x86/mm/tlb: "Make lazy TLB mode even lazier". Linux Kernel Mailing List, https://lkml.org/lkml/2017/12/5/1082, Aug. 25, 2016 (2 pages).
Bogdan F.Romanescu, et al., "Unified instruction/translation/data (unitd) coherence: One protocol to rule them all". In HPCA-16 2010 The Sixteenth International Symposium on High-Performance Computer Architecture, pp. 1-12. IEEE, 2010.
The Linux Kernel. Page table isolation (pti). https://www.kernel.org/doc/html/latest/x86/pti.html,4 pages., Sep. 21, 2020.
Volkmar Uhlig. "Scalability of Microkernel-based Systems". PhD thesis, TH Karlsruhe, 2005. https://os.itec.kit.edu/downloads/publ_2005_uhlig_ scalability_phd-thesis.pdf (139 pages).
Carlos Villavieja, Vasileios Karakostas, Lluis Vilanova, Yoav Etsion, Alex Ramirez, Avi Mendelson, Nacho Navarro, Adrian Cristal, and Osman S Unsal. "Didi: Mitigating the performance impact of TLB shoot-downs using a shared TLB Directory". In 2011 International Conference on Parallel Architectures and Compilation Techniques, pp. 340-349. IEEE, 2011.
Carl A. Waldspurger. Memory resource management in VMware ESX server. In USENIX Symposium on Operating Systems Design & Implementation (OSDI), vol. 36, pp. 15, 2002.
Zi Yan, Ján Vesel'y, Guilherme Cox, and Abhishek Bhattacharjee. "Hardware Translation Coherence for Virtualized Systems". In ACM SIGARCH Computer Architecture News, vol. 45, pp. 14. ACM, 2017.
Related U.S. Appl. No. 17/021,872, filed Sep. 15, 2020.
"Non-Final Office Actions issued in Related U.S. Appl. No. 17/021,872", dated Aug. 17, 2021, 16 pages.

* cited by examiner

EARLY ACKNOWLEDGEMENT OF TRANSLATION LOOKASIDE BUFFER SHOOTDOWNS

CROSS-REFERENCES TO RELATED APPLICATIONS

The present application is related to commonly-owned U.S. patent application Ser. No. 17/021,872 entitled "Consolidating Shared State for Translation Lookaside Buffer Shootdowns" and filed herewith, the entire contents of which are incorporated herein by reference for all purposes.

BACKGROUND

A translation lookaside buffer (TLB) is a cache which stores virtual-to-physical memory address mappings, known as page table entries (PTEs), that have been recently accessed by a processor of a computer system. By retrieving PTEs from the TLB rather than from page tables residing in main memory, the processor can significantly accelerate virtual memory operations.

In a symmetric multiprocessor (SMP) system comprising multiple processors (referred to herein as "processing cores" or simply "cores"), each processing core has its own TLB, which means that PTEs must be synchronized—or in other words, made "coherent"—across the per-core TLBs in order to ensure security and correctness. Most existing processor architectures do not implement TLB coherence in hardware, and thus a software mechanism known as TLB shootdown is employed at the operating system (OS) level to carry out this synchronization.

TLB shootdowns are expensive to perform because they involve a complex protocol that burdens multiple processing cores in the system and can take several thousand compute cycles to complete. The performance impact of TLB shootdowns can be mitigated to an extent by reducing the frequency at which they are invoked via techniques such as batching. However, aggressively eliminating TLB shootdowns using these techniques is error-prone and can potentially result in safety violations.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for improving the performance of TLB shootdowns by optimizing the TLB shootdown mechanism implemented by existing OS kernels. One such optimization, referred to herein as "early acknowledgement," reduces the amount of synchronous waiting performed by a processing core that initiates a TLB shootdown and thus reduces the total time needed to complete the TLB shootdown. Another optimization, referred to herein as "shared state consolidation," consolidates the in-memory locations of certain shared variables and data structures that are accessed by different processing cores during a TLB shootdown, which eliminates unnecessary contention across the processing cores' CPU (central processing unit) caches and improves CPU cache hit rate. These and other aspects of the present disclosure are described in further detail in the sections that follow.

2. Example Computer System and Solution Architecture

Figure 1:
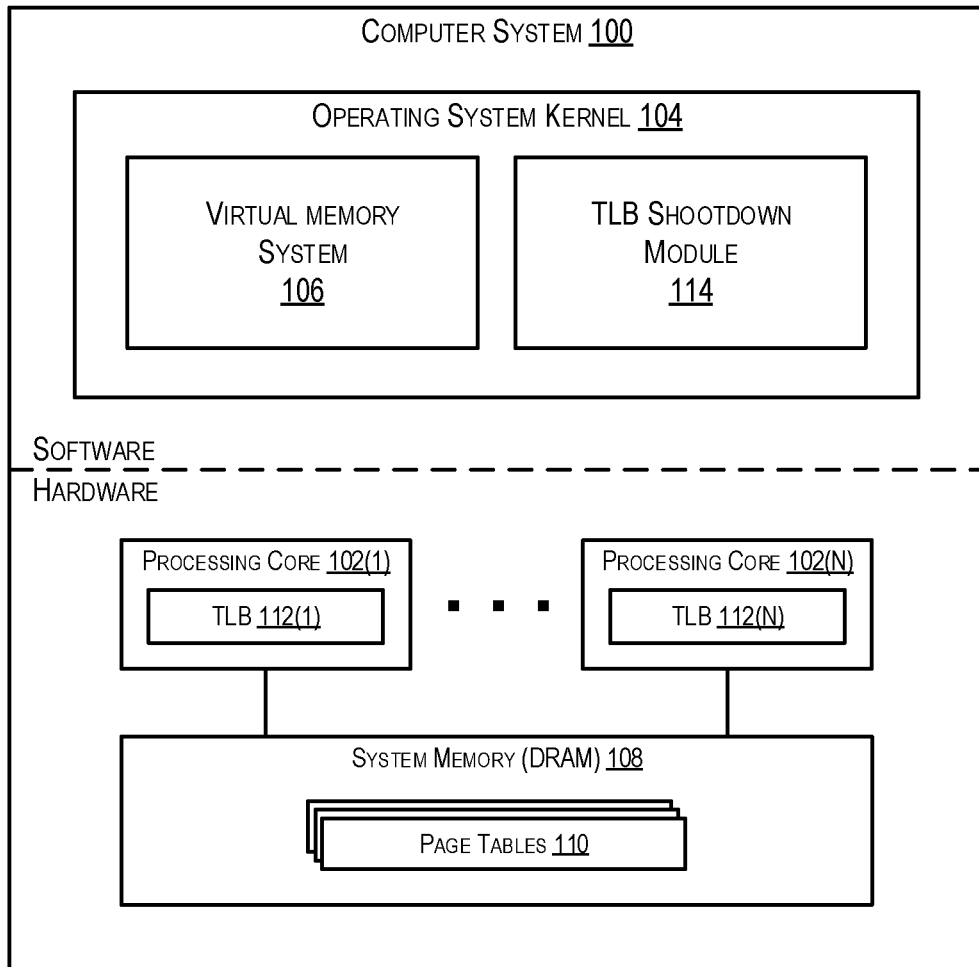
FIG. 1 depicts an example computer system.

To provide context for the embodiments described herein, FIG. 1 is a simplified block diagram of an example computer system 100 that includes a plurality of processing cores 102(1)-(N) and an OS kernel 104 that implements virtual memory via a virtual memory system 106. As known in the art, virtual memory is a memory management paradigm that involves presenting separate logical (i.e., virtual) memory address spaces to software processes, where each virtual memory address space is an abstraction of the physical memory address space of system memory. At the time a process submits a request to read or write a virtual memory address, the virtual memory address is translated, via a combination of software and hardware, into a corresponding physical memory address. The physical memory address is then accessed in system memory to fulfill the read/write request.

As shown in FIG. 1, each processing core 102 of computer system 100 is attached to a shared system memory (e.g., DRAM) 108, which stores a set of page tables 110 that hold the virtual-to-physical memory address mappings (i.e., page table entries (PTEs)) managed by virtual memory system 106 of OS kernel 104. In addition, each processing core 102 includes a TLB 112 which caches PTEs that have been recently accessed by that processing core from pages tables 110 and thus allows for fast virtual-to-physical address translations. For example, assume a process running on processing core 102(1) submits a request to read the contents of a virtual memory address A1. In this scenario, if processing core 102(1) can find a PTE for virtual memory address A1 in its TLB 112(1) (known as a "TLB hit"), processing core 102(1) can immediately retrieve the corresponding physical memory address from TLB 112(1) and proceed with completing the read. In contrast, if processing core 102(1) cannot find a PTE for virtual memory address A1 in TLB 112(1) (known as a "TLB miss"), processing core 102(1) must perform a traversal (known as a "page walk") through page tables 110 in system memory 108 to determine the physical memory address mapped to A1, which is a time consuming task.

For TLB caching to work as intended, it is important that the PTEs cached in TLBs 112(1)-(N) are kept coherent/synchronized with the state of those PTEs in page tables 110. If this coherency is not maintained, a process may access a stale (i.e., no longer valid) PTE via a TLB, resulting in correctness and/or security issues. There are several events/operations that can change or invalidate PTEs in page tables 110 and thus cause the cached versions of those PTEs in TLBs 112(1)-(N) to become stale, such as memory deduplication, reclamation, huge page compaction, and NUMA (non-uniform memory access) memory migration. In addition, user applications may modify/invalidate PTEs in page tables 110 by invoking certain OS system calls and by writing to copy-on-write (CoW) memory pages.

In the case where one or more PTEs cached in a single TLB become stale, a kernel process running on the TLB's processing core can perform a "TLB flush," which removes/invalidates some or all of the PTEs in that TLB (and thus will cause the processing core to retrieve the flushed PTEs from page tables 110 in response to future memory requests). However, in the case where one or more PTEs cached in multiple TLBs become stale (which may occur if the same virtual memory address space is used across multiple processing cores), the OS kernel must do more than simply flush a single TLB. This is because existing processor architectures generally do not provide hardware TLB coherence and therefore will not automatically propagate a TLB flush from one TLB to another.

To address this issue, OS kernel 104 of computer system 100 includes a TLB shootdown module 114 that allows the OS kernel to implement a software-based synchronization mechanism known as TLB shootdown. Through this mechanism, at the time a kernel process running on a first (i.e., "initiator") processing core determines that one or more PTEs in a virtual address space S1 have become stale and need to be flushed from its TLB, the kernel process can instruct other (i.e., "remote") processing cores that are actively using S1 to also flush those same PTEs from their respective TLBs. In this way, OS kernel 104 can ensure that all TLBs 112(1)-(N) in computer system 100 remain consistent with each other, despite the lack of TLB coherence at the hardware level.

Figure 2:
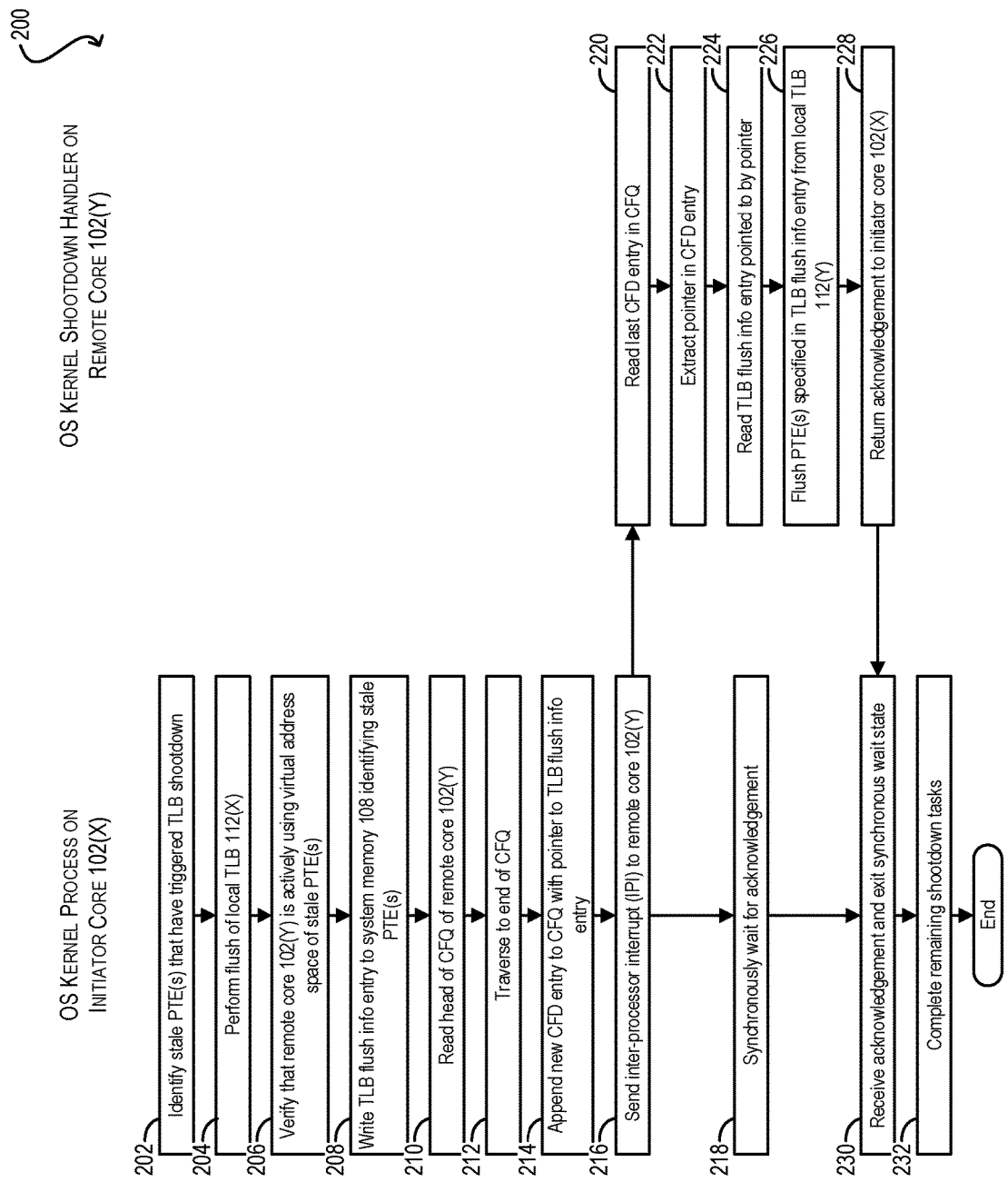
FIG. 2 depicts a conventional TLB shootdown workflow.

To further clarify how TLB shootdowns conventionally work, FIG. 2 depicts a workflow 200 that may be performed by a process of OS kernel 104 running on an initiator core 102(X) of computer system 100 (referred to as the "initiator core process") and a shootdown interrupt handler of OS kernel 104 running on a remote core 102(Y) of computer system 100 (referred to as the "remote core handler") for flushing—or in other words, "shooting down"—the TLB of remote core 102(Y) in accordance with TLB shootdown module 114. Although workflow 200 depicts the shootdown of a single remote core for simplicity of illustration and explanation, it should be appreciated the initiator core can concurrently execute multiple TLB shootdowns with respect to multiple remote cores (i.e., one shootdown for each remote core that includes stale PTE(s) in its local TLB).

Starting with blocks 202 and 204, the initiator core process can identify one or more PTEs that have triggered the current TLB shootdown (i.e., the PTE(s) that have become stale/require flushing) and can perform a TLB flush to remove those PTE(s) from its local TLB 112(X). Depending on the number of stale PTEs, the initiator core process may either (1) flush only those PTEs, (2) flush all PTEs in the virtual address space in which the stale PTEs reside, or (3) flush the entirety of the TLB.

At block 206, the initiator core process can verify that remote core 102(Y) is actively using the virtual address space of the stale PTE(s) identified at block 202. In a particular embodiment, this step include checking the value of a "lazy mode" indicator for remote core 102(Y) that is present in system memory 108 and that indicates whether remote core 102(Y) is currently running a kernel process/thread (in which case a shootdown of the remote core's TLB is not be needed) or a user process/thread (in which case a TLB shootdown is needed). A shootdown is not needed in the former scenario (i.e., when the lazy mode indicator indicates that the remote core 102(Y) is currently running a kernel process/thread) because the remote core's TLB will be automatically flushed the next time a context switch occurs at that remote core from kernel space to user space.

Assuming that the verification at block 206 is successful (i.e., remote core 102(Y) is actively using the virtual address space of the stale PTE(s)), the initiator core process can write a new data entry in system memory 108, referred to as a "TLB flush info" entry, that includes information regarding the PTE(s) (or range of PTEs) to be flushed from TLB 112(Y) of remote core 102(Y) (block 208). This information can identify the same PTEs that were flushed from the initiator core's local TLB 112(X) at block 204. The initiator core process can further read the head element of an SMP queue that is associated with remote core 102(Y) (referred to as a "call function queue" (CFQ)) and is stored in system memory 108 (block 210), traverse to the end of the CFQ (block 212), and append a new queue entry, referred to as a "call function data" (CFD) entry, to the end of the CFQ that includes a pointer to the TLB flush info entry created at block 208 (block 214). Upon appending the CFD entry, the initiator core process can send an inter-processor interrupt (IPI) to remote core 102(Y) (thereby invoking the remote core's shootdown interrupt hander) (block 216) and can synchronously wait for an acknowledgement (block 218).

On the remote core side, in response to the IPI, the remote core handler can read from system memory 108 the last CFD entry in its CFQ (i.e., the CFD entry appended by the initiator core process at block 214) (block 220), extract the pointer included in the CFD entry (block 222), and read the TLB flush info entry referenced by the extracted pointer (i.e., the TLB flush info entry written by the initiator core process at block 208) (block 224). The remote core handler can then flush the PTE(s) specified in the TLB flush info entry from its local TLB 112(Y) (block 226) and return an acknowledgement to initiator core 102(X) (by, e.g., updating a flag/bit in the CFD) indicating that its TLB flush has been completed (block 228).

At block 230, the initiator core process can receive the acknowledgement from the remote core handler and exit out of its synchronous wait state. Finally, at block 232, the initiator core process can carry out any remaining tasks needed to finalize the TLB shootdown and terminate the workflow.

As noted in the Background section, the conventional TLB shootdown workflow shown in FIG. 2 is quite expensive from a performance perspective for several reasons. For example, it can take several thousand compute cycles for the remote core handler to receive the IPI invoked by the initiator core process, flush its local TLB, and return an acknowledgement to the initiator core process. Further, due to the way in which the initiator core process and the remote core handler access/exchange information via shared variables and data structures during the shootdown and the typical placement of these shared variables/data structures in system memory 108, workflow 200 can, in certain implementations, result in a large amount of CPU cache contention across the system's processing cores.

Figure 3:
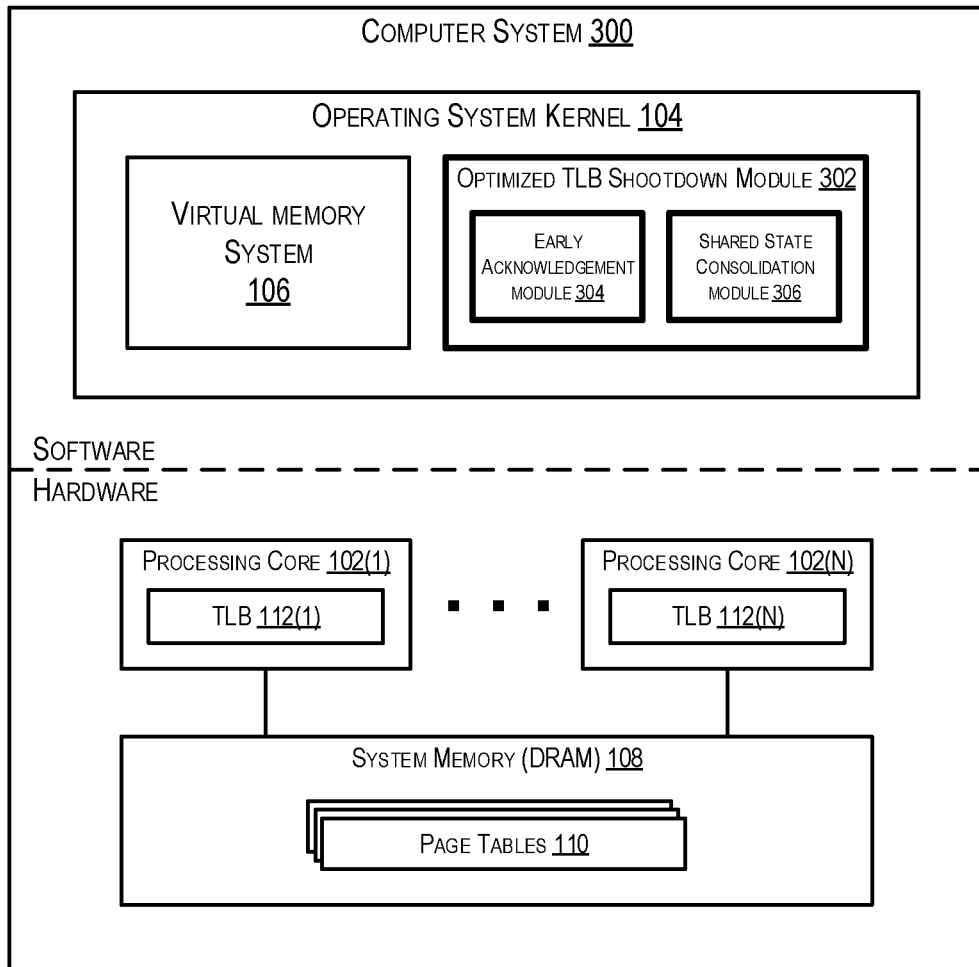
FIG. 3 depicts a computer system that implements the TLB shootdown optimization techniques of the present disclosure according to certain embodiments.

To address the foregoing and other related performance problems, FIG. 3 depicts an enhanced version of computer system 100 (i.e., computer system 300) that includes an optimized TLB shootdown module 302 in OS kernel 104 with two novel components: an early acknowledgement module 304 and a shared state consolidation module 306. As detailed in section (3) below, early acknowledgement module 304 can enable each remote core to return an acknowledgement to the initiator core immediately upon entering its shootdown interrupt handler, rather than after flushing its local TLB. This optimization advantageously eliminates much of the synchronous waiting performed by the initiator core process at block 218 of FIG. 2. And as detailed in section (4) below, shared state consolidation module 306 can enable OS kernel 104 to consolidate, in system memory 108, certain portions of the shared state used by the initiator and remote cores during a TLB shootdown. This optimization advantageously reduces the amount of CPU cache contention generated by TLB shootdowns and increases the CPU cache hit rate of the initiator and remote cores at the time of accessing that shared state.

It should be appreciated that FIGS. 1-3 are illustrative and not intended to limit embodiments of the present disclosure. For example, although FIGS. 1 and 3 depict a particular arrangement of components within computer systems 100 and 300, other arrangements are possible (e.g., the functionality attributed to one component may be split into multiple components, components may be combined, etc.). In addition, each component may include sub-components or implement functionality that is not specifically described. One of ordinary skill in the art will recognize other variations, modifications, and alternatives.

3. Early Acknowledgement

As discussed above, in conventional TLB shootdown implementations the shootdown interrupt handler of a remote core will not return an acknowledgment to the initiator core process until it has finished flushing its local TLB. However, once a remote core enters its shootdown interrupt handler, the remote core will generally not access any user-space PTEs in the system page tables. Therefore, it is safe for the remote core handler return the acknowledgement to the initiator core process prior to, rather than after, executing its local TLB flush. Early acknowledgement module 304 of FIG. 3 leverages this observation to move the acknowledgment step to the very start of the remote core's shootdown interrupt handler routine, thereby eliminating the remote-side TLB flush operation from the TLB shootdown critical path.

Figure 4:
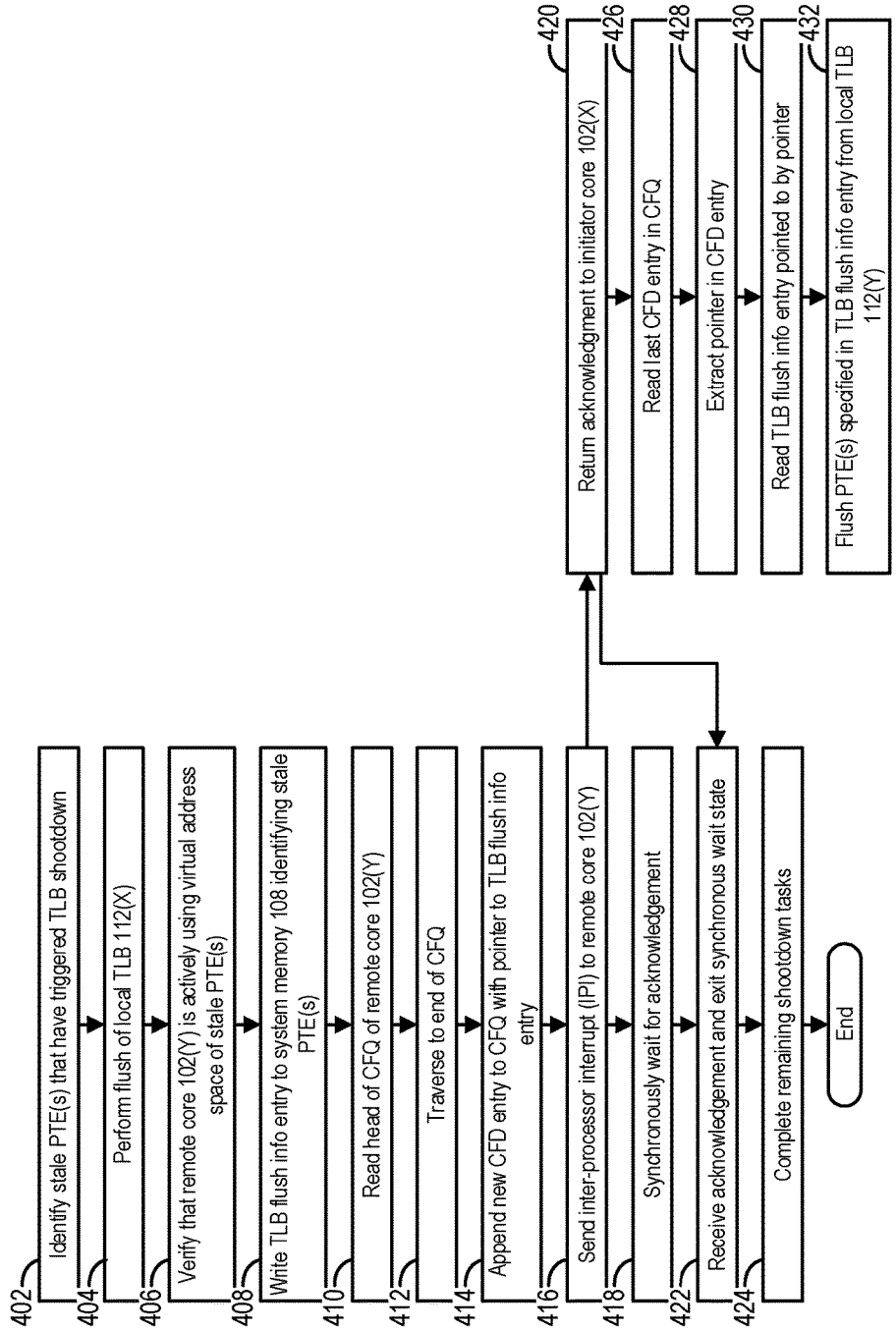
FIG. 4 depicts a TLB shootdown workflow that implements early acknowledgement according to certain embodiments.

FIG. 4 depicts a modified version of TLB shootdown workflow 200 of FIG. 2 (i.e., workflow 400) that implements this early acknowledgement optimization according to certain embodiments. Blocks 402-418 are largely similar to blocks 202-218 of workflow 200. However, upon being invoked via the IPI sent by the initiator core process, the remote core handler on remote core 102(Y) can immediately return an acknowledgement to the initiator core process indicating that its local TLB flush is complete (block 420). This enables the initiator core process to exit its synchronous wait state earlier than in conventional workflow 200 and proceed with its remaining shootdown tasks (blocks 422 and 424). Concurrently with block 422 (and after sending the acknowledgement at block 420), the remote core handler can move forward with executing the flush of remote-side TLB 112(Y) in accordance with blocks 426-432.

It should be appreciated that workflow 400 is illustrative and various modifications are possible. For example, in certain embodiments the initiator core process can perform the flush of its local TLB 112(X) while waiting to receive the IPI acknowledgement from the remote core (i.e., during the wait state of block 418), rather than prior to sending the IPI (i.e., at block 404). Even with the early acknowledgement optimization implemented in FIG. 4, the total roundtrip time for transmitting the IPI to remote core 102(Y) and receiving the acknowledgement can potentially take over 1000 cycles. Thus, by performing its local TLB flush during this waiting period, the initiator core process can remove much of the latency of the local flush operation from the shootdown critical path.

In addition, it should be noted that there are two scenarios in which early acknowledgement may cause issues. First, if a process releases one or more page tables 110 in system memory 108 (via, e.g., a munmap or other similar OS system call), speculative page walks performed by a processing core can result in a machine-check exception and system crash. Accordingly, remote cores should not return early acknowledgements in this scenario. To enforce this, the initiator core process can check whether any page tables have been released (or in other words, have been un-mapped from system memory 108) prior to sending the IPI to remote cores. If so, the initiator core process can provide an instruction to the remote cores (as part of, e.g., the CFD or TLB flush info entries) that early acknowledgement should be not performed. Then, upon receiving the IPI, the shootdown interrupt handler of each remote core can look for this instruction. If found, the remote core handler can process the shootdown according to the conventional workflow shown in FIG. 2, rather than according to the early acknowledgement workflow shown in FIG. 4.

Second, if another higher priority interrupt (such as, e.g., a non-maskable interrupt (NMI)) is delivered to a remote core after the remote core has acknowledged a TLB shootdown but before it has flushed its local TLB, the remote core interrupt handler for that higher priority interrupt may inadvertently access stale PTEs from the TLB. To address this issue, the handler routines of such higher priority interrupts can check, at the time of accessing one or more user-space PTEs, whether there is a pending TLB flush that has not yet been executed. If so, the handler routines can execute the pending TLB flush before proceeding with accessing the user-space PTE(s).

4. Shared State Consolidation

Figure 5:
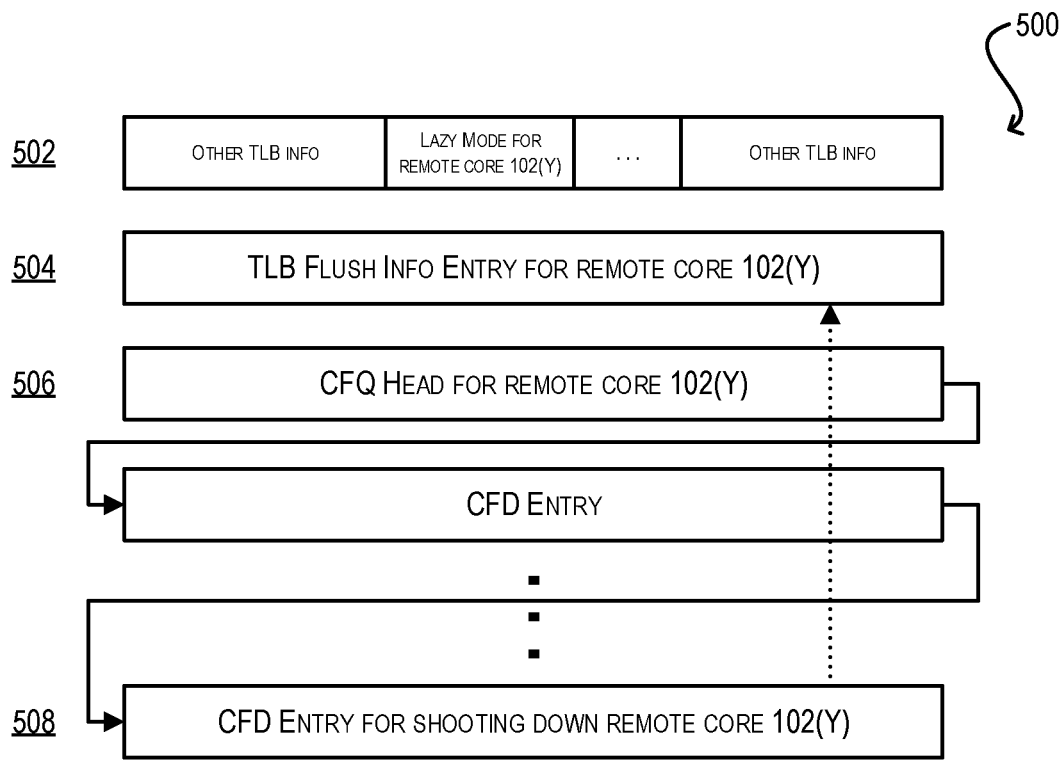
FIG. 5 depicts the organization of shared state used for TLB shootdowns in a CPU cache according to a conventional OS kernel implementation.

Due to the way in which some OS kernels organize the shared in-memory state used by initiator cores and remote cores during a TLB shootdown (e.g., lazy mode indicators, TLB flush info entries, per-core CFQs and CFD entries), when this shared state is brought into the CPU caches of the initiator/remote cores and accessed, a large amount of cache contention can be generated, resulting in poor performance. To clarify why this is the case, FIG. 5 depicts the contents of a CPU cache 500 of initiator core 102(X) at the time of invoking a TLB shootdown of remote core 102(Y) (per, e.g., workflow 200 of FIG. 2) in accordance with the conventional memory configuration of the Linux kernel. Each row of CPU cache 500 represents a separate cache line in the cache.

As shown in FIG. 5, the lazy mode indicator for remote core 102(Y) is located in cache line 502, along with other TLB-related information pertaining to remote core 102(Y). In addition, the TLB flush info entry created by initiator core 102(X) for remote core 102(Y) is placed in its own cache line 504 that is separate from the cache lines holding the CFQ head element and CFD entry for shooting down remote core 102(Y) (reference numerals 506 and 508). The CFD entry in cache line 508 includes a pointer to the TLB flush info entry in cache line 504.

The issues with the cache organization depicted in FIG. 5 are two-fold. First, because the cache line that holds the lazy mode indicator for remote core 102(Y) (i.e., cache line 502) is shared with other per-core TLB information, each time remote core 102(Y) modifies any of the other data in cache line 502 (which will typically occur frequently), initiator core 102(X) will be forced to reload the entirety of cache line 502 into its CPU cache, even though initiator core 102(X) is only interested in the lazy mode indicator for remote core 102(Y) (which will typically be changed on a less frequent basis).

Second, because the TLB flush info entry created for remote core 102(Y) is located in its own cache line 504 that is separate from the CFQ/CFD entries for that remote core, it is less likely that this data will be in the CPU cache of remote core 102(Y) at the time of reading its CFQ and carrying out its local TLB flush, resulting in a cache miss and increased latency for completing the flush operation.

To address the foregoing issues, shared state consolidation module 306 of FIG. 3 can enable OS kernel 104 to consolidate the shared state used by the initiator and remote cores as described below. The general idea behind this shared state consolidation is to move data that is used during a shootdown from multiple cache lines into a single cache line (or at least fewer cache lines), thereby reducing the amount of false sharing and cache contention generated at the time of accessing those cache lines from the per-core CPU caches (particularly because in the existing cache configuration shown in FIG. 5, some of those multiple cache lines contain state unrelated to shootdown processing).

- Co-locate, in system memory 108, the lazy mode indicator and CFQ head element of each remote core so that they fit within a single CPU cache line. This prevents the lazy mode indicator from residing on the same cache line as the other per-core TLB information mentioned above and thus reduces the amount of contention for that cache line. This also improves the initiator core's CPU cache hit rate at the time of accessing the CFQ head element for a given remote core, because the initiator core will read the CFQ head element soon after reading the remote core's lazy mode indicator per, e.g., block 406-410 of workflow 400.
- Co-locate, in system memory 108, the TLB flush info entry and CFD entry for shooting down each remote core so that they fit within a single CPU cache line. This improves the CPU cache hit rate of the remote core at the time of accessing the TLB flush info entry, because the remote core will access this entry soon after reading the corresponding CFD entry per, e.g., blocks 424-428 of workflow 400.

Figure 6:
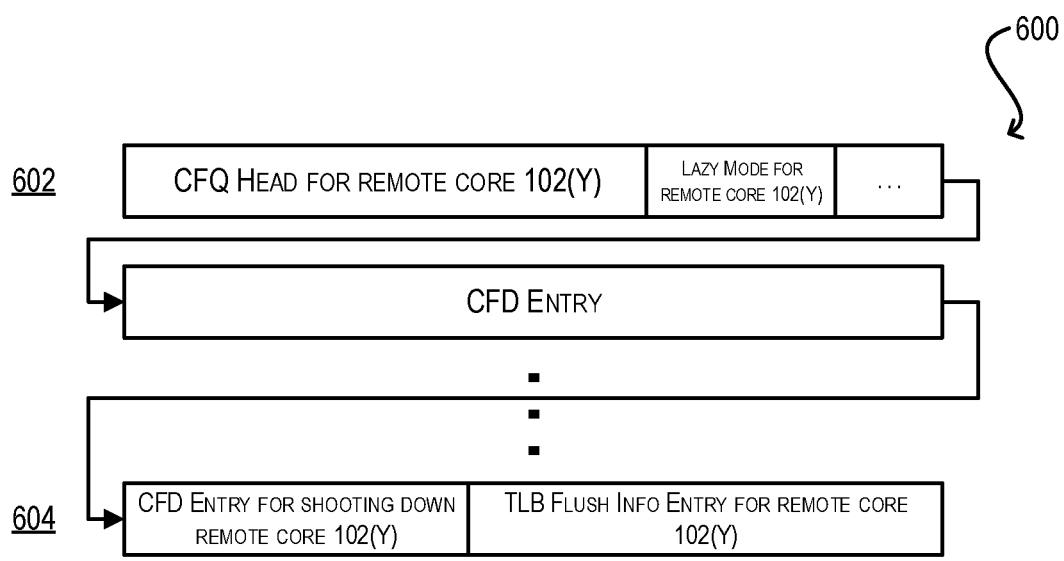
FIG. 6 depicts the organization of shared state used for TLB shootdowns in a CPU cache in accordance with the shared state consolidation optimization of the present disclosure.

FIG. 6 depicts the results of the foregoing changes in the CPU cache of initiator core 102(X) (reference numeral 600) according to certain embodiments. As shown in FIG. 6, the lazy mode indicator for remote core 102(Y) is now located in the same cache line 602 as the CFQ head element for that core. In addition, the TLB flush info entry for remote core 102(Y) is located in the same cache line 604 as the CFD entry for shooting down that core. This contrasts with the configuration shown in FIG. 5 where the CFD entry for shooting down remote core 102(Y) includes a pointer to the TLB flush info entry, which resides in an entirely separate cache line.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
    receiving, by a first processing core of a computer system, an inter-processor interrupt (IPI) from a second processing core of the computer system for performing a translation lookaside buffer (TLB) shootdown of the first processing core;
    upon receiving the IPI, communicating, by an interrupt handler of the first processing core, an acknowledgement to the second processing core that a TLB of the first processing core has been flushed; and
    subsequently to communicating the acknowledgement, executing, by the interrupt handler of the first processing core, a flush of the TLB of the first processing core,
    wherein the second processing core performs a flush of a TLB of the second processing core after sending the IPI to the first processing core and while waiting for the acknowledgement.

2. The method of claim 1 further comprising, prior to communicating the acknowledgement:
    determining, by the interrupt handler of the first processing core, that one or more page tables of the computer system have not been released.

3. The method of claim 2 wherein the determining is based on an instruction provided by the second processing core.

4. The method of claim 1 further comprising, prior to executing the flush of the TLB of the first processing core:
    receiving, by the first processing core, another interrupt that is higher priority than the IPI; and
    executing, by another interrupt handler of the first processing core, a routine for handling said another interrupt, the executing comprising:
        upon determining that a user-space page table entry (PTE) needs to be accessed, executing the flush of the TLB prior to accessing the user-space PTE.

5. The method of claim 1 wherein executing the flush of the TLB of the first processing core comprises accessing a call function data (CFD) entry and a TLB flush info entry written by the second processing core into a system memory of the computer system, and
    wherein the CFD entry and the TLB flush info entry are co-located in the system memory in a manner that enables the entries to fit within a single cache line of a CPU (central processing unit) cache of the first processing core.

6. The method of claim 1 wherein the second processing core transmits the IPI to the first processing core by accessing a lazy mode indicator and a call function queue (CFQ) head element for the first processing core in a system memory of the computer system, and
    wherein the lazy mode indicator and the CFQ head element are co-located in the system memory in a manner that enables the lazy mode indicator and the CFQ head element to fit within a single cache line of a CPU cache of the second processing core.

7. A non-transitory computer readable storage medium having stored thereon instructions executable by a computer system, the instructions embodying a method comprising:
    receiving, by a first processing core of a computer system, an inter-processor interrupt (IPI) from a second processing core of the computer system for performing a translation lookaside buffer (TLB) shootdown of the first processing core;
    upon receiving the IPI, communicating, by an interrupt handler of the first processing core, an acknowledgement to the second processing core that a TLB of the first processing core has been flushed; and
    subsequently to communicating the acknowledgement, executing, by the interrupt handler of the first processing core, a flush of the TLB of the first processing core,
    wherein the second processing core performs a flush of a TLB of the second processing core after sending the IPI to the first processing core and while waiting for the acknowledgement.

8. The non-transitory computer readable storage medium of claim 7 wherein the method further comprises, prior to communicating the acknowledgement:
    determining, by the interrupt handler of the first processing core, that one or more page tables of the computer system have not been released.

9. The non-transitory computer readable storage medium of claim 8 wherein the determining is based on an instruction provided by the second processing core.

10. The non-transitory computer readable storage medium of claim 7 wherein the method further comprises, prior to executing the flush of the TLB of the first processing core:
    receiving, by the first processing core, another interrupt that is higher priority than the IPI; and
    executing, by another interrupt handler of the first processing core, a routine for handling said another interrupt, the executing comprising:
        upon determining that a user-space page table entry (PTE) needs to be accessed, executing the flush of the TLB prior to accessing the user-space PTE.

11. The non-transitory computer readable storage medium of claim 7 wherein executing the flush of the TLB of the first processing core comprises accessing a call function data (CFD) entry and a TLB flush info entry written by the second processing core into a system memory of the computer system, and
    wherein the CFD entry and the TLB flush info entry are co-located in the system memory in a manner that enables the entries to fit within a single cache line of a CPU (central processing unit) cache of the first processing core.

12. The non-transitory computer readable storage medium of claim 7 wherein the second processing core transmits the IPI to the first processing core by accessing a lazy mode indicator and a call function queue (CFQ) head element for the first processing core in a system memory of the computer system, and
    wherein the lazy mode indicator and the CFQ head element are co-located in the system memory in a manner that enables the lazy mode indicator and the CFQ head element to fit within a single cache line of a CPU cache of the second processing core.

13. A computer system comprising:
    first and second processing cores, each including a translation lookaside buffer (TLB);
    a system memory; and
    a non-transitory computer readable medium having stored thereon program code for an interrupt handler that, when executed by the first processing core, causes the first processing core to, upon receiving an inter-processor interrupt (IPI) from the second processing core for performing a TLB shootdown of the first processing core:

communicate an acknowledgement to the second processing core that the TLB of the first processing core has been flushed; and subsequently to communicating the acknowledgement, execute a flush of the TLB of the first processing core, wherein the second processing core performs a flush of a TLB of the second processing core after sending the IPI to the first processing core and while waiting for the acknowledgement.

14. The computer system of claim 13 wherein the program code further causes the first processing core to, prior to communicating the acknowledgement:

determine that one or more page tables of the computer system have not been released.

15. The computer system of claim 14 wherein the determining is based on an instruction provided by the second processing core.

16. The computer system of claim 13 wherein the program code further causes the first processing core to, prior to executing the flush of the TLB of the first processing core:

receive another interrupt that is higher priority than the IPI; and execute, via another interrupt handler of the first processing core, a routine for handling said another interrupt, the executing comprising:

upon determining that a user-space page table entry (PTE) needs to be accessed, executing the flush of the TLB of the first processing core prior to accessing the user-space PTE.

17. The computer system of claim 13 wherein executing the flush of the TLB of the first processing core comprises accessing a call function data (CFD) entry and a TLB flush info entry written by the second processing core into the system memory, and wherein the CFD entry and the TLB flush info entry are co-located in the system memory in a manner that enables the entries to fit within a single cache line of a CPU (central processing unit) cache of the first processing core.

18. The computer system of claim 13 wherein the second processing core transmits the IPI to the first processing core by accessing a lazy mode indicator and a call function queue (CFQ) head element for the first processing core in the system memory, and wherein the lazy mode indicator and the CFQ head element are co-located in the system memory in a manner that enables the lazy mode indicator and the CFQ head element to fit within a single cache line of a CPU cache of the second processing core.

19. A method comprising:

receiving, by a first processing core of a computer system, an inter-processor interrupt (IPI) from a second processing core of the computer system for performing a translation lookaside buffer (TLB) shootdown of the first processing core;

upon receiving the IPI, communicating, by an interrupt handler of the first processing core, an acknowledgement to the second processing core that a TLB of the first processing core has been flushed; and subsequently to communicating the acknowledgement, executing, by the interrupt handler of the first processing core, a flush of the TLB of the first processing core, wherein the first processing core receives another interrupt that is higher priority than the IPI prior to executing the flush, and wherein upon determining that said another interrupt indicates that a user-space page table entry (PTE) needs to be accessed, the first processing core executes the flush prior to accessing the user-space PTE.

* * * * *